(12) United States Patent
Short

(10) Patent No.: US 7,628,933 B2
(45) Date of Patent: Dec. 8, 2009

(54) LUBRICATING OIL COMPOSITIONS USING POLYALKYLENE GLYCOL DERIVATIVES

(75) Inventor: Glenn Short, Wixom, MI (US)

(73) Assignees: Glenn D. Short, Wixom, MI (US); BVA Inc., Wixom, MI (US)

( * ) Notice: Subject to any disclaimer, the term of this patent is extended or adjusted under 35 U.S.C. 154(b) by 345 days.

(21) Appl. No.: 11/507,218

(22) Filed: Aug. 21, 2006

(65) Prior Publication Data
US 2007/0040148 A1 Feb. 22, 2007

Related U.S. Application Data

(60) Provisional application No. 60/709,996, filed on Aug. 19, 2005.

(51) Int. Cl.
  *C10M 145/26* (2006.01)
  *C10M 145/34* (2006.01)
(52) U.S. Cl. .......................... 252/68; 508/110; 508/579; 508/583
(58) Field of Classification Search ................ 252/68; 508/110, 579, 583
See application file for complete search history.

(56) References Cited

U.S. PATENT DOCUMENTS

| 5,595,678 A | * | 1/1997 | Short et al. | ................. 252/68 |
| 7,435,273 B2 | * | 10/2008 | Lange et al. | ................. 44/442 |

\* cited by examiner

*Primary Examiner*—Harold Pyon
*Assistant Examiner*—Monique Peets
(74) *Attorney, Agent, or Firm*—Kohn & Associates, PLLC

(57) ABSTRACT

A lubricant includes a hydrocarbon end group of the formula alkyl-phenol-alkylene oxide-Y wherein Y is the hydrocarbon end group; and wherein the polyalkylene glycol has the formula $Z((CH_2CH(R_1)O)_n(CH_2CH(R_1)O)_m)_pH$ wherein Z is a residue of an aryl compound having 1-8 active hydrogens and at least 10 carbons when Z is an aryl group; $R_1$ is hydrogen, methyl, ethyl, or a mixture thereof; n is 0 or a positive number; m is a positive number; and p is an integer having a value equal to the number of active hydrogens, the compound of which Z is a residue, Y replacing the H. A fluid composition for use in refrigeration systems including the lubricant and a refrigerant. A method of lubricating compression refrigeration equipment The lubricant used as a seal swell additive, an additive for compressor and machinery applications, a mineral oil pour point improver, a machinery cleanser, and a carbon dioxide additive.

18 Claims, 5 Drawing Sheets

LUBRICATING OIL COMPOSITIONS USING POLYALKYLENE GLYCOL DERIVATIVES

CROSS-REFERENCE TO RELATED APPLICATIONS

This application claims the benefit of priority under 35 U.S.C. Section 119(e) of U.S. Provisional Patent Application No. 60/709,996, filed Aug. 19, 2005, which is incorporated herein by reference.

BACKGROUND OF THE INVENTION (1) Field of the Invention

Generally, the present invention relates to a lubricating oil or lubricating oil additive. More specifically, the present invention relates to an ammonia oil additive.

(2) Description of Related Art

Ammonia has long served as a refrigerant and continues to be an important refrigerant. Ammonia has been found to have no effect on the depletion of the ozone layer and, equally as important, ammonia does not contribute to the greenhouse effect. The greenhouse effect is the gradual warming of the earth's atmosphere due to the build-up within the atmosphere of certain greenhouse gases such as $CO_2$ and $NO_2$. Because ammonia has a very brief atmospheric life, it does not contribute to the buildup of greenhouse gasses.

In addition, ammonia has many attractive advantages such as being a highly efficient refrigerant at a relatively low cost. On the downside, the major disadvantages of using ammonia as a refrigerant are due to its toxicity and, to a certain extent, to its flammability. However, these disadvantages have led to improved compressor and system designs that provide for more impervious barriers to prevent the escape of ammonia refrigerant from the system. Also, because of its distinctive and easily detectable odor, ammonia leaks can be more easily detected than certain other refrigerants and quickly eliminated.

The use of ammonia as a refrigerant has been limited to a certain extent due to physical and chemical interactions of ammonia with traditional refrigeration compressor lubricants. These limitations are generally the result of a lack of miscibility (liquid ammonia with lubricant) and solubility (gaseous ammonia with lubricant) of ammonia with conventional lubricants which interferes with the efficient transfer of heat and, in some cases, limits the efficient use of ammonia with certain types of heat exchangers.

It is well known in the art that traditional refrigeration lubricants such as mineral oil and synthetic hydrocarbon fluids/oils become less soluble with ammonia as temperature decreases and, thus, the lubricant can separate or drop out into system low spots such as intercoolers, suction accumulators, and evaporators. As the oil migrates to the low spots in the system, it becomes necessary to add more oil to the compressor, thereby further perpetuating the problem. Elaborate means that normally require the lubricant to be drained manually from the system, such as oil stills and drain connections at the bottom of evaporators, recirculators, intercoolers, etc., have been used to remove the oil.

In the evaporator where ammonia is present in liquid form, mineral oils and synthetic hydrocarbon oils are immiscible with the liquid ammonia and the oil tends to "foul" heat exchange surfaces causing a loss of heat transfer efficiency. In evaporators where the ammonia refrigerant is present in gaseous form, mineral oils become viscous due to a lack of solubility and tend to build up in thick film on the heat transfer surfaces. This increased viscosity not only causes a loss of heat transfer efficiency, but also restricts the flow of the refrigerant causing increased pressure within the system contributing to further losses in the efficiency of the system.

The function of a compressor lubricant is to provide adequate lubrication to compressor parts. To best perform this function, the lubricant should remain in the compressor rather than circulating through the entire system. Oils having low volatility characteristics will not turn into vapor at compressor discharge temperatures and, thus, may be removed with oil separators. It is inevitable, however, that the oil will naturally come into contact with the refrigerant in the compressor where it is entrained by the refrigerant in the form of small particles. Discharge side oil separators generally are not 100% efficient at separating the oil from the refrigerant, thus a certain amount of oil will pass to the condenser and the liquid receiver where it will be carried by the liquid refrigerant into the evaporator.

The presence of oil circulating through the system adversely affects the efficiency and capacity of the entire system. The major reason for this is the tendency of the oil to adhere to and to form a film on the surfaces of the condenser and evaporator tubes (or surfaces) reducing the heat transfer capacity of the condenser and the evaporator tubes. The effect of an oil film in evaporators has been shown to decrease the efficiency of a system, which can easily be 20% in an air cooler to 40% or more, with increasing oil film thickness, in brine chillers. It is obvious that it is desirable to maintain both compressor lubrication and system efficiency. This can best be accomplished by a lubricant with a low volatility which can be easily returned from the system to an oil reservoir where it can perform its intended lubrication function.

The Mobil Oil Corporation publication "Refrigeration Compressor Lubrication with Synthetic Fluids", which is incorporated herein by reference, discusses systems of the type with which the present invention finds use. Evaporators may be classified according to the relative amount of liquid and vapor refrigerant that flows through the evaporator. The "dry expansion" evaporator is fed by means of a flow control device with just enough refrigerant so that essentially all of the refrigerant evaporates before leaving the evaporator. In a flooded evaporator, the heat exchange surfaces are partially or completely wetted by a liquid refrigerant.

A direct expansion (DX) coil is one example of an evaporator in which a liquid refrigerant and a certain amount of flash gas is present as the refrigerant enters the evaporator. Flash gas is gas which appears when a refrigerant as a saturated liquid passes through an expansion valve undergoing a drop in pressure and instantaneously forming some gas, i.e., flash gas. As the refrigerant moves downstream through the system, the proportion of vapor increases until essentially all of the refrigerant is in vapor form before exiting the evaporator.

Shell and tube and flooded coil evaporators are both typical examples of flooded evaporators. In flooded evaporators, all of the heat transfer surfaces are wetted by the liquid refrigerant.

In an ammonia flooded evaporator, conventional mineral oils and synthetic hydrocarbon oils are essentially immiscible with ammonia. Any amount of oil entering the system tends to foul the heat transfer surfaces resulting in a loss of system efficiency. Because the oils typically are heavier than liquid ammonia, provisions must be made to remove the oil from low areas in the evaporator, as well as other low areas in the system. Additionally, an oil separator is almost always required.

In direct expansion evaporators using soluble halocarbon refrigerants, refrigerant velocity must be maintained at a sufficiently high rate at the heat exchanger outlet to effectively return the lubricant to the compressor. One study with R-12 in mineral oil indicates that an oil which is miscible and has an oil content of less than 10% will have little or no effect on the heat transfer coefficient. However, it is desirable to keep oil concentration low due to the effect on pressure caused by the oil. As the oil/refrigerant mixture passes through the heat exchange tubes, it increases in viscosity due to both reduction in temperature and increased oil concentration. The increased oil concentration results in a pressure increase. This suggests that an oil/refrigerant mixture with a lower operational viscosity, particularly with some dissolved refrigerant, will reduce the effect on pressure resistance.

In the case of ammonia, normal naphthenic or paraffinic lubricants and synthetic hydrocarbon fluids/oils have low solubility and miscibility in ammonia. These oils are heavier than ammonia and tend to form an oil film on the heat transfer surfaces, or "foul", decreasing the system capacity and efficiency. The low solubility inherent with these oils also results in less dilution by the ammonia and a greater increase in refrigerant in direct expansion systems. The oil film, then, can become too thick for efficient heat transfer thereby contributing to excessive pressure increases in the evaporator and restricted oil return to the compressor.

Welded plate and hybrid cross-flow plate evaporators have been proposed which would provide significant reductions in required refrigerant volume for ammonia systems. The reduction in required refrigerant volumes allows for the achievement of efficient heat transfer while also reducing the potential for ammonia refrigerant leakage. The reduction in refrigerant charge volumes also enables ammonia to be safely permitted for use in a much wider variety of applications in addition to its common industrial applications. Further advantages of this type of system design include lower system cost and reduced system size and weight. However, in order to take full advantage of this type of evaporator system, it would be desirable to use lubricants that have both a minimum effect on heat transfer efficiency and a minimum of pressure restriction in the evaporator.

Most lubricants used for refrigeration compressors with ammonia as a refrigerant are lubricated with an oil with an ISO viscosity grade (VG) of 32-100, where the ISO VG represents the approximate viscosity of the oil at 40° C. In some cases, such as with some rotary screw compressors, the ISO VG can be as high as 220. Because normal evaporators operate at a temperature of approximately −40° C., it is desirable to have a lubricant that is a fluid at −40° C. In some cases, synthetic oils are used for evaporator temperatures below −40° C., as conventional oils are usually solid at these temperatures. Improving the low temperature fluidity through selection of an oil which has a lower viscosity at evaporator temperatures helps to improve oil return. Improving the low temperature oil return represents a partial solution to the problem of the fouling of heat transfer surfaces.

Generally, with immiscible oils, a reduction in oil concentration results in a reduction in terminal oil film thickness and also increases the amount of time for the oil to reach this thickness. Constant removal of oil from the system, which is assisted through improved fluidity, is one method to reduce oil concentration.

Another method useful for reducing oil concentration is to decrease the amount of oil entering the system. Oil separators are designed to remove nearly all of the liquid oil from the compressor discharge vapor. Unfortunately, these separators cannot remove oil that is in vapor form. Oil vapor passes through these separators and condenses in the condenser together with the ammonia vapor and eventually flows to the evaporator. The efficiency of these oil separators is such that the oil concentration can be as little as 0.2 parts per million in mass in the ammonia refrigerant at saturation temperatures of 25° C. to over 70 parts per million in mass at 100° C. when conventional oils are used.

The miscibility of mineral oils and synthetic hydrocarbon oils in ammonia is generally limited to less than one part per million in mass. Oil scrubbers have been proposed to eliminate oil from entering the system. Oil scrubbers may be suitable for large systems but are often considered undesirable for smaller systems, especially those with direct expansion evaporators where it is desirable to reduce the amount of ammonia in the system and limit weight through elimination of unnecessary piping and accessories.

Attempts have been made to overcome the problems associated with the use of ammonia refrigerant with direct expansion evaporators. An example of this is German patent DE 4202913 A1 that discloses the use of conventional mineral oil circulating through so-called dry evaporator (direct expansion). However, the circulation through the dry evaporator is limited due to both poor solubility of the ammonia refrigerant in the mineral oil lubricant and due to poor low temperature viscosity of the mineral oil lubricant. The resulting restriction to the evaporation of ammonia caused by the oil prevents efficient heat transfer.

The use of dry evaporators (direct expansion) with ammonia refrigerant is desirable, particularly in installations of relatively small and medium sized capacity, as the refrigerant capacity and, therefore, the hazard of escaping ammonia is reduced. The German patent DE 4202913 A1 also teaches the use of low molecular weight amines such as mono-, di-, and trimethylamine which are added to the ammonia refrigerant to enhance the solubility of the conventional oil (mineral oil) in the ammonia refrigerant. However, the use of amines can result in additional problems with safety. The flash point for these amines ranges from −10° C. or monomethylamine to −12.2° C. or trimethylamine. A further safety issue involves the explosive limits in air for these two amines. Monomethylamine has an explosive limit in air of 5-21%; trimethylamine has an explosive limit in air of 2-11.6%. Both of these amines are classified as being dangerous fire risks. Although ammonia is known to be flammable, the range of flammability is limited to concentrations in the air of between 16-35%. The addition of the amine component to increase the solubility of the ammonia refrigerant in the conventional mineral oil lubricant amplifies the hazardous nature of the combination and thereby limits its possible applications.

Japanese Patent Application No. 5-9483 to Kaimai et al. discloses a lubricant for ammonia refrigerants that is a capped polyether compound containing organic oxides. The Kaimai et al. reference uses R groups (R, $R_1$, —$R_{10}$) that are alkyl groups having less than ten carbons in length, preferably are less than four carbons in length, to cap the ends of the lubricant molecule. Kaimai et al. teaches that the total number of carbons (exclusive of the organic oxide groups) suitable for polyether lubricants is 8 or below with alkyl groups of 1-4 carbons being preferred. Polyether lubricant compounds of greater than eight carbons were discouraged by Kaimai et al. due to incompatibility with ammonia.

Matlock and Clinton in the chapter entitled "Polyalkylene Glycols" in Synthetic Lubricants and High Performance Functional Fluids, which is incorporated herein by reference, discusses the class of synthetic lubricants called polyalkylene glycols. Polyalkylene glycols, also known as polyglycols, are one of the major classes of synthetic lubricants and have found a variety of specialty applications as lubricants, particularly in applications where petroleum lubricants fail.

Because ammonia is more soluble in polyglycols than synthetic hydrocarbon fluids or mineral oils, it was thought that polyglycols would not offer any efficiency benefits in ammonia refrigeration systems.

Polyalkylene glycol (PAG) is the common name for the homopolymers of ethylene oxide, propylene oxide, or the copolymers of ethylene oxide and propylene oxide. Polyalkylene glycols have long been known as being soluble with ammonia and have been marketed for use in ammonia refrigeration applications.

U.S. Pat. No. 4,851,144 to McGraw et al. teaches a lubricant composition including a mixture of a polyalkylene glycol and esters. McGraw discloses conventional polyglycol lubricants for hydrofluorocarbon refrigerants having a hydrocarbon chain of $C_1$ to $C_8$. In order to increase the miscibility of the lubricants, McGraw teaches the addition of esters. The use of esters with ammonia lubricants is contraindicated due to the immediate formation of sludges and solids that foul heat transfer surfaces and reduce overall system efficiency.

U.S. Pat. No. 6,189,322 to Ishihara, et al. teaches a refrigerant-circulating system comprising a refrigeration cycle including a refrigerant compressor, a condenser, an expansion mechanism and an evaporator to form a refrigerant circuit and employing a refrigerant which contains no chlorine, wherein an aromatic polyether oil having as a base oil structure a benzene ring having an ether bond is employed as a refrigerator oil. However, Ishihara discloses only short chain alkyl groups, which is only desirable if miscibility is desired all the time. This is not always wanted, and therefore it would be desirable to be able to adjust miscibility of a refrigerant.

Because polyalkylene glycols are polar in nature and, therefore, water soluble, they are not very soluble in non-polar media such as hydrocarbons. The insolubility of polyalkylene glycols in non-polar media make them excellent compressor lubricants for non-polar gasses such as ethylene, natural gas, land fill gas, helium, or nitrogen (Matlock and Clinton at page 119). Because of this polar nature, polyalkylene glycols have the potential for further becoming highly suitable lubricants for use with ammonia refrigerants. However, the same polar nature that allows polyalkylene glycols to be soluble in ammonia is the same property that allows polyalkylene glycols to be soluble in water. Solubility with water has been a long-standing concern in ammonia refrigeration applications. The presence of excessive water can result in corrosion of the refrigeration system. Bulletin No. 108 of the International Institute of Ammonia Refrigeration entitled, "Water Contamination in Ammonia Refrigeration Systems", which is incorporated herein by reference, discusses the prevailing concerns associated with water contamination of ammonia refrigeration systems. The high specific volume of water as a vapor results in the need for large equipment or, conversely, if water is allowed to accumulate in excessive amounts, equipment designed for ammonia refrigeration would eventually become undersized due to the displacement of the refrigerant by the excess water volume.

It is not uncommon, especially in larger ammonia refrigeration systems, for moisture to enter the system. In the case of ammonia refrigeration systems using mineral oil lubricants, water can be easily separated from the oil before it is returned from the system to the compressor. The elimination of water in this case may be accomplished by manually "blowing out" or releasing the water just prior to its entry into the evaporator. However, because the solubility of water in conventional polyalkylene glycols ranges from a few percent to complete solubility, removal of the water becomes a more difficult task.

Another drawback for the use of conventional types of polyalkylene glycols, particularly those containing ethoxylates, as lubricants with ammonia refrigerants is that they may be too miscible to be used with flooded evaporators that were designed for mineral oils. This type of evaporator uses the lack of miscibility of mineral oil with ammonia to effect removal of mineral oil from the evaporator and subsequently returns the oil to the compressor. Because of its higher specific gravity, the mineral oil can then be drained off from the bottom of the system and returned to the compressor.

Very high levels of miscibility and solubility with ammonia can also result in a loss of lubricity. In the case of hydrodynamic lubrication, the viscosity of the oil/refrigerant mixture is important at the operating conditions, i.e., temperature and pressure of the compressor. It may be necessary to use a higher viscosity grade of polyalkylene glycol to provide the desired operating viscosity under diluted conditions for adequate fluid flow. In the case of dry exchange evaporators, the use of a lubricant with an excessively high viscosity may result in excessive diluted viscosity in the evaporator causing the accumulation of the lubricant and thus a restricted flow. This restricted flow can reduce the heat exchange efficiency of the system. Though this situation is somewhat compensated for by the high viscosity index characteristics of the polyalkylene glycols and the near complete miscibility and high solubility in the accompanying dilution of the refrigerant, boundary lubrication in the compressor may suffer because of these highly miscible polyalkylene glycols.

It is well known in the art that mineral oils have a tendency to age in ammonia refrigeration systems. This aging results in the oil breaking down and forming lighter fractions as well as forming a sludge-like material which collects within the system and which is difficult to remove. The lighter fractions contribute to the problems associated with providing an effective method for separating the oil from the refrigerant because the lighter fractions of oil become vapor thereby preventing the oil from entering into the refrigeration system.

The sludge-like materials, which are essentially insoluble in mineral oils, drop out of solution and form deposits that contribute to the "fouling" of heat exchanging surfaces throughout the system and may further interfere with the operation of values and other mechanical devices. It, therefore, becomes imperative to provide a mechanism that prevents the build up of sludge-like materials. One such method would be to provide a lubricant that resists aging. Another method would be to provide a mechanism for removing the sludge build-up. The simplest method would be to add fresh oil to the system to flush out or dissolve the sludge-like material. However, mineral oils and synthetic oils have little or no capacity to dissolve the sludge-like materials formed in ammonia refrigeration system.

Because of the good solvency characteristics of polyalkylene glycols, these lubricants could provide a very viable alternative lubricant source for the conversion or retro-fitting of systems previously using lubricants such as mineral oil. That is, by switching to polyalkylene glycol lubricants, the build-up of sludge-like materials can be removed on changeover.

Heretofore, the prior art in the field of polyalkylene glycol-based lubricants was void of any lubricant that encompassed the necessary properties of refrigeration compressor lubricants for ammonia refrigerants. These key properties include miscibility, solubility, compatibility with mineral oils and synthetic hydrocarbon oils/fluids, low volatility, water insolubility, lubricity, and rheology (viscosity temperature characteristics). Therefore, it is a goal of the present invention to provide improved lubricant fluids and their method of manufacture resulting in fluids having an excellent balance of miscibility, solubility, and viscosity, thereby making the fluids excellent lubricants for ammonia compression refrigeration systems.

BRIEF SUMMARY OF THE INVENTION

The present invention provides for a lubricant including a hydrocarbon end group of the formula alkyl-phenol-alkylene oxide-Y wherein Y is the hydrocarbon end group; and wherein the polyalkylene glycol has the formula $Z((CH_2CH(R_1)O)_n(CH_2CH(R_1)O)_m)_pH$ wherein Z is a residue of an aryl compound having 1-8 active hydrogens and at least 10 carbons when Z is an aryl group; $R_1$ is hydrogen, methyl, ethyl, or a mixture thereof; n is 0 or a positive number;

m is a positive number; and p is an integer having a value equal to the number of active hydrogens in the compound of which Z is a residue.

The present invention further provides a fluid composition for use in refrigeration systems including the above lubricant and a refrigerant.

The present invention also provides a method of lubricating compression refrigeration equipment, including the step of mixing the above lubricant with a compound chosen from a refrigerant, carbon dioxide, propane, or hydrocarbon gas. Provision is also made for the above lubricant to be used as a seal swell additive, an additive for compressor and machinery applications, a mineral oil pour point improver, a machinery cleanser, and a carbon dioxide additive.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
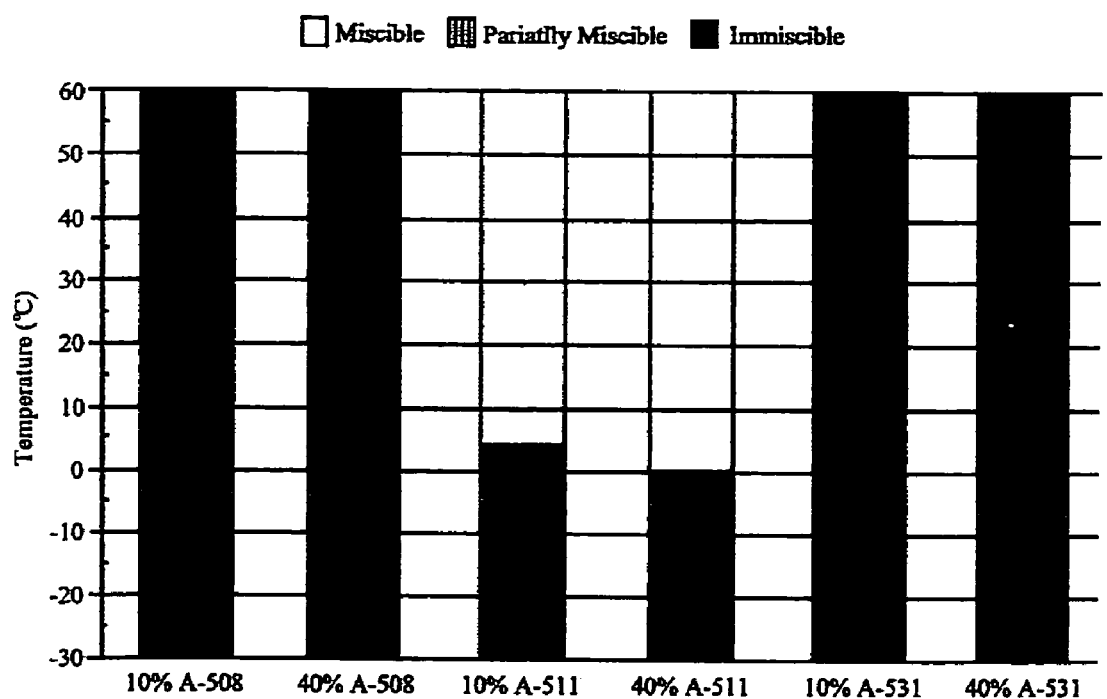
FIG. 1 is a graph showing the results of miscibility tests of three different lubricants in ammonia.

The present invention provides a aromatic polyether oil for use as a lubricant (a lubricating oil or lubricating oil additive) and more particularly for use as a lubricating oil or lubricating oil additive in compression type refrigeration equipment or in pumps. The invention composition includes alkyl phenol alkoxylates with hydrocarbon end groups. The composition can include either a methyl end group ($CH_3$), and alkyl end group, an aryl end group or other end group consisting of carbon and hydrogen. Specifically, the oil additive can have either of the following formulas:

alkyl-phenol-alkylene oxide-Y wherein Y is an alkyl or aryl or other hydrocarbon end group;

Or more specifically, Y is

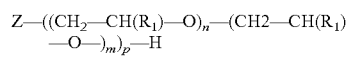

The nonyl phenol may be easily replaced with other alkyl phenol, or dialkyl phenol. And the $CH_3$ could easily be replaced with another hydrocarbon. The end group creates a composition that is more oil soluble and less water soluble.

The additive of the present invention is essentially an aromatic polyether oil derived from a polyalkylene glycol. Preferably the polyalkylene glycol has the general formula:

$Z-((CH_2-CH(R_1)-O)_n-(CH2-CH(R_1)-O-)_m)_p-H$ wherein Z is an aryl residue of a compound having 1-8 active hydrogens and at least 10 carbons where Z is an aryl group;
$R_1$ is hydrogen, methyl, ethyl, or a mixture thereof;
N is 0 or a positive number;
M is a positive number; and
P is an integer having a value equal to the number of active hydrogens of the compound of which Z is a residue.

The H is replaced by the novel Y group.

The lubricant includes an organic oxide and an alcohol for initiating the formation of the polyalkylene glycol. The alcohol/initiator is characterized by a chemical structure that contains a larger number of carbon atoms in relationship to the number of active hydrogen atoms. The lubricant composition is further characterized by having a ratio of molecular weight of the alcohol to the molecular weight of the composition of between about 8-55%. The alcohol provides a hydrocarbon chain that acts as a means for controlling both the solubility and miscibility of the lubricant in ammonia while at the same time reducing the solubility of the lubricants with water. Additionally, the hydrocarbon chain facilitates compatibility of the lubricants with mineral oils. Since the hydrocarbon chain is hydrophobic and non-polar, it is insoluble in ammonia. This insolubility provides for a means for adjusting and controlling both solubility and miscibility in ammonia. In addition, the greater the length of the hydrocarbon chain, the better the lubricative properties of the lubricant.

The alkyl phenol is also referred to as the initiator. The term initiator denotes that an alcohol initiates or commences the formation of the polymeric structure that becomes the polyalkylene glycol. Unlike a catalyst, part of the initiator (Z) becomes a part of polyalkylene glycol that is produced. That is, the initiator is not regenerated like a true catalyst but, actually facilitates the formation of polyalkylene glycol.

Preferably the initiator used in the formation of the lubricant composition is an alcohol having a total carbon number greater than ten ($>C_{10}$) for alkyl hydrocarbons and a total carbon number greater than six ($>C_6$) for aryl hydrocarbons. Other alcohol/initiator compounds that are useful include phenol, methyl phenol, ethyl phenol, propyl phenol, nonyl phenol, dinonyl phenol and other similar derivatives of phenol.

The organic oxides useful in the present invention can include any organic oxide but, the most preferable, ethylene oxide, propylene oxide, butylene oxide or mixtures thereof.

In accordance with the present invention, applicants have determined alcohols/initiators with a chemical structure containing larger amounts of carbon atoms in relationship to the number of active hydrogens provides for excellent properties of both miscibility and solubility. That is, for example, typical prior art initiators for common polyglycols or polyalkylene glycols are water (no carbons), amines (no carbons), short chain alcohols such as methanol, ethanol, butanol or short chain polyols such as glycerol or ethylene glycols are used in the formation of the polyalkylene glycols. The ratio of the molecular weight of these prior art alcohols/initiators to the total weight of the alcohols/initiators of the polyalkylene glycol molecule formed is approximately 1-7%. In contrast, applicants have found, by using alcohols/initiators containing larger amounts of carbon atoms in relationship to the number of active hydrogen atoms, that the ratio of molecular weight of the alcohol/initiator to the total weight of the polyalkylene glycol molecule formed is in the range of 8-55%.

Applicants have determined that polymers of organic oxides, such as ethylene oxide, propylene oxide, butylene oxide and mixtures thereof further contribute to the excellent properties of the lubricants in ammonia. In addition to contributing to the miscibility characteristics of the lubricant composition in ammonia, the organic oxide, such as ethylene oxide, can be used to modify the solubility characteristics of the lubricant in ammonia as well. The polyalkylene glycols are homo- or co-polymers of the various organic oxides. By blending various mixtures of organic oxides, applicants have found that other characteristics such as miscibility/solubility, pour point temperature, and water solubility can be modified. By modifying the relative amounts of the organic oxides, the solubility and miscibility of the lubricants in ammonia can varied. Since the affinity of the organic oxides for ammonia decreases with increasing carbon number, ethylene oxide>propylene oxide>butylene oxide, the ammonia miscibility and solubility characteristics can be tailored by combining the organic oxides to form a lubricant having the desired levels of miscibility and solubility.

The water solubility of the lubricant can, for example, be modified (decreased) by forming polymers of propylene oxide. This polymer is generally less polar because the extra carbon on the propylene oxide blocks or hinders the oxygen atom and, therefore, the lubricant formed using this organic oxide is less soluble in water. By having a larger amount of carbon atoms comprising the lubricant, water solubility is reduced; however; water solubility can be increased, if desired, by adding a more hydrophilic organic oxide such as ethylene oxide. Other combinations of oxides can be used in order to adjust or tailor the properties of the lubricant to meet specific needs or applications.

The water solubility, lubricity, and materials compatibility of the lubricant can also be adjusted with the hydrocarbon end group. The applicants have found that by replacing the hydroxyl end group (OH) on a polyalkylene glycol with hydrocarbons such as methyl, ethyl and the like, further contribute to the excellent properties of the lubricants in ammonia. For example, the solubility with moisture can be reduced. Another example is that the stability with the ammonia may be improved. Still another example is that the compatibility with common elastomers and similar materials may be adjusted and improved.

Preferably there is a sufficient amount of the lubricant in the compressor to provide lubrication and sealing. In dealing with the compressor, the lubricating fluid is thought of as a solution of refrigerant dissolved in the lubricant. Such a composition generally comprises a majority of lubricant. Of course, depending on the compressor conditions and system design, the ratio of refrigerant to lubricant could be a very high concentration. In other parts of the refrigeration system such as the evaporator, the lubricant may be thought of as dissolved in the refrigerant. Refrigerants are classified as completely miscible, partially miscible, or immiscible with lubricants depending on their degree of mutual solubility. Partially miscible mixtures of refrigerant and lubricant are mutually soluble at certain temperatures and lubricant-in-refrigerant concentrations, and separate into two or more liquid phases under other conditions.

Applicants have found that in order to produce an ideal polyalkylene glycol derivative lubricant for use with ammonia, the lubricant must be soluble in gaseous ammonia without being overly soluble in gaseous ammonia and miscible in liquid ammonia without being overly miscible in liquid ammonia. By "ideal" it is meant that the degrees of solubility and miscibility are adjusted to meet the needs of a particular system. Typically, miscibility comes with increased solubility. For certain systems the ideal lubricant would be soluble, thereby reducing viscosity, without being miscible. A lubricant that is overly soluble in gaseous ammonia would cause foaming or dilution due to the excess amount of ammonia entrained in the lubricant. An overly miscible lubricant can be defined as having a critical separation temperature below that of the evaporator condition. An ideal lubricant would separate from the liquid refrigerant allowing for efficient collection and return to the compressor. A highly soluble conventional polyalkylene glycol derivative lubricant also tends to be highly miscible in ammonia. That is, the lubricant will stay miscible in a single clear phase with ammonia even at very low temperatures. This miscibility prevents effective separation of the lubricant from liquid ammonia and results in the subsequent return of excess amounts of ammonia to the compressor. Another problem with highly soluble lubricants arises from foaming caused by the cycle of increasing the pressure of a refrigeration system (to dissolve gaseous ammonia) and then decreasing the pressure of the system. Gaseous ammonia is release during the decrease in pressure causing foaming of the lubricant within the system.

By varying the oxides used in the formation of the polyalkylene glycol derivative lubricants of the present invention, solubility and miscibility characteristics can be optimized for a given application or system.

The lubricant composition of the present invention is a polyalkylene glycol derivative with a molecular weight ranging from 200 to 4000. The preferred molecular weight range for suitable for use with ammonia refrigerants ranges from 400 to 2000.

The viscosity of the lubricant composition @ 40° C. can be adjusted between 10 to 500 cSt depending on the particular viscosity required for a given application or system. The preferred viscosity of the lubricant composition @ 40° C. is between 25 to 150 cSt.

The lubricant composition can further include the aromatic polyether oil of the present invention blended with or formulated to include other more common lubricants such as common polyglycols, polyethers, esters, mineral oils, and synthetic hydrocarbons. These more common lubricants could be blend or mixed with the polyalkylene glycol derivatives of the present invention in percentages ranging from 10 to 25% without completely compromising the improved properties of the fluids of the present invention. These lubricant blends or formulations could be used for systems or applications which require that the lubricant be compatible with preexisting lubricant requirements such as retro-fitted systems, i.e., systems converted from mineral oil lubrication to polyalkylene glycol lubrication, systems converted from halogen based refrigerants to ammonia based refrigerants, or as naturally occurring by-products of retro-fitted systems, i.e., mixing of lubricants of the present invention with residual or existing lubricants in a system. In other words, the ability of the lubricants of the present invention to function in these blends may be necessary to achieve compatibility with pre-existing refrigeration systems or lubricants.

For miscibility with ammonia, generally, the composition includes at most 20 to 25% of other lubricants. Certain polyalkylene glycols are miscible and so could be used at a greater percentage. The composition, including additives or blends of polyglycol, mineral oil, polyalphaolefins, alkyl naphthalene or alkyl benzene with the base fluid composition of the present invention is found to improve certain characteristics of the composition of the present invention such as compatibility with systems previously utilizing any one of either polyglycol lubricants, mineral oil lubricants, polyalphaolefin lubricants, alkyl naphthalene lubricants or alkyl benzene lubricants. The blending of polyglycols, mineral oil, polyalphaolefin lubricants, alkyl naphthalene or alkyl benzene can be accomplished without impairing the improved properties and characteristics of the lubricants of the present invention.

The lubricant compositions may also be understood to include the usual additions such as anti-oxidants, corrosion inhibitors, hydrolysis inhibitors, etc., such as identified in U.S. Pat. No. 4,851,144 that is incorporated herein by reference. The percentages used in the foregoing description and claims are to be considered as the compositions defined prior to the additions of such additives.

In order to be suitable lubricants for both ammonia refrigeration systems and chlorofluorocarbon (CFC), hydrofluorocarbon (HFC), or hydrochlorofluorocarbon (HCFC) refrigeration systems (retro-fit or conversion refrigeration systems), the polyalkylene glycol derivative lubricants of the present invention must be able to be formulated in order to be compatible with these refrigerants. By the term compatible it is meant that the lubricants possess properties such as miscibility, solubility, viscosity, volatility, lubricity, thermal/chemical stability, metal compatibility, and floc point (for CFC and HCFC applications) such that the lubricant functions properly in the chosen refrigerant environment. In addition, compatibility also encompasses solubility in mineral oil. That is, the polyalkylene glycol derivatives of the present invention are soluble in conventional mineral oil lubricants. This solubility in mineral oil provides an indication of the compatibility and, possibly, the interchangeability of the lubricants of the present invention with conventional mineral oil lubricants. This interchangeability is an especially important property in system retro-fitting with new lubricants or in system conversions from non-ammonia refrigerants to ammonia refrigerants. In view of the above, the present invention provides a fluid composition including the lubricant composition as described above and a refrigerant such as ammonia, chlorofluorocarbons, hydrochlorofluorocarbons, and hydrofluorocarbons. That is, the subject lubricant can be mixed with or added to ammonia as well as non-ammonia refrigerants in order to provide a fluid composition suitable for compression refrigerator equipment. The amount of lubricant added to the fluid composition depends on the type of system being used and the requirements of the system all of which is known to those skilled in the compression refrigeration arts.

Similarly, the aromatic polyether oil has been found to be compatible with air, hydrocarbon gases, and with carbon dioxide. Adjustments to the proportions of the initiator, the alkoxylate, and the end group, can produce a lubricant with various viscosities, various pour points, and various thermal properties. For example a material with a pour point of −40° C. or below in the presence of the refrigerant may be desirable for refrigeration applications using carbon dioxide as the refrigerant. Similarly such adjustments can increase miscibility with carbon dioxide where that property is desirable. Adjustments in the amount and type of alkoxylates can change the solubility and miscibility with hydrocarbon gasses. For applications such as refrigeration using hydrocarbon gas as the refrigerant, miscibility can be obtained. For applications such as industrial hydrocarbon gas compression, or collection and compression of natural gas, solubility can be reduced to improve compression efficiency. In some cases a balance of miscibility and solubility is desirable.

Also in view of the above, the present invention provides a method of lubricating compression refrigeration equipment by using a lubricant composition including the aromatic polyether oil of the present invention. That is, the subject fluid composition can be mixed with refrigerants such as ammonia, CFC's, HCFC's (such as HCFC-22 (R-22)), and HFC's (such as HFC-134a (R-134a)), carbon dioxide, propane or other hydrocarbon gasses to provide lubrication in compression lubrication equipment.

The aromatic polyether oil of the present invention has numerous uses. For example, the above description provides a detailed use of the present invention with refrigerants. Additionally, the present invention can be used as a general lubricant, a seal swell additive, in combination with other oils for related uses, as an additive for compressor and machinery applications, alone, and for use to improve pour points in mineral oils. It can also be used to assist other additives in lubrication, the polyalkylene glycol derivative can be used to dissolve additives or help oil coalesce. Finally, it can be used alone or in combination with other materials as a machinery cleaner by assisting in removing materials such as carbon, varnishes, or other oils from machinery.

As an additive, present invention when present in a concentration as low as 0.5% can help some properties, such as assisting solubility of other additives in base fluids such as highly refined mineral oils, synthetic hydrocarbons and certain conventional polyalkylene glycols or assisting pour point in mineral oils. As a cleaner it can take a few percent or can be used alone in some circumstances. And as a seal swell additive it can be used in small amounts up to several percent, with 2 to 20% being preferable.

For example the invention can include adding a few percent, typically from 5 to 20%, of the polyalkylene glycol derivative into the existing lubricant being used in an air compressor to assist in removing carbon deposits, varnish and other materials that have deposited in the system. The polyalkylene glycol derivative helps to loosen the carbon deposits and varnish. The system is then drained, flushed and new lubricant added for continued operation. The polyalkylene glycol derivative can be combined with esters or other additives for this purpose. Esters, such as diesters or polyol esters, have been commonly used as "compressor cleaner" for this purpose. The polyalkylene glycol derivative may also be formulated into an air compressor lubricant to help prevent the deposits from forming.

As a lubricant, the present invention can be combined in a wide range of percentages with other synthetic or mineral oils. For example an air compressor lubricant/coolant may be formulated with as little as 1% of the polyalkylene glycol derivative as a seal swell additive or to improve pour point, to 100% as the lubricant.

U.S. Pat. No. 6,677,284, to Tolfa, described polyalkylene glycols based on alkyl phenol initiators to assist the compatibility of elastomers in ammonia refrigeration systems using lubricants such as mineral oils and synthetic hydrocarbon oils. The same materials were previously described in U.S. Pat. No. 5,595,678, to Short, as a lubricant for ammonia refrigeration. This sort of a polyalkylene glycol leaves the hydroxyl (OH) as the end group. The applicants feel that the presence of the hydroxyl group limits the flexibility to adjust the physical, thermal and chemical properties of the lubricant or lubricant additive. The hydroxyl group also has an affinity towards water, which may be undesirable in certain applications. Additionally, for a given viscosity, using the same initiator and same proportion of propoxylates, the applicant's nonyl phenol propoxylate derivative generally has a significantly higher molecular weight. As a result, for an equal viscosity, a lubricant with lower volatility can be produced. This property has been described as particularly important for certain types of compressor applications where coalescing filters are used for oil removal.

EXAMPLES

Example 1

Two nonyl phenol propoxylates were prepared: one using hydroxyl (OH) as an end group, and another using methyl (CH3) as an end group and compared with other fluids to find their influence as an additive in highly refined mineral oils and in polyalphaolefin type synthetic hydrocarbon fluids. Tests were run both in air atmosphere and in an ammonia atmosphere and the influence of the polyalkylene glycols as an additive in mineral oils and polyalphaolefin type synthetics on two types of elastomers was determined. Results of the tests can be found in TABLE 1.

The influence of the aromatic polyether oil was also found to improve low temperature properties. In general, it was found that certain structures can help lower the pour point of a hydrotreated mineral oil by 3 to 6 degrees Celsius when combined with certain pour point additives. Visually the blended product remained clearer at low temperatures when the polyalkylene glycol derivative was included. Samples with an amine antioxidant were noticeably clearer at −20° C. when 3 percent of the polyalkylene glycol derivative was included in a mineral oil blend, suggesting that the polyalkylene glycol derivative assisted in the additive's solubility in the oil.

The NP-PAG as described by Tolfa was used as a comparison standard as this product has proven useful in ammonia refrigeration compression applications as an elastomer seal conditioner. Tolfa reported the effects of the same Hydrotreated Oils and of PAO. The main objective of adding a seal swell additive to the HT or PAO is to prevent shrinkage of o-rings and other seals in ammonia systems. PAO and hydrotreated mineral oils tend to shrink and harden elastomers. The objective is not to overly soften the elastomer while not shrinking the elastomer.

Test results show that with HT-68 as the major component, commonly used in ammonia compression, the A508 provided statistically equal results to the NP-PAG. Test results in PAO-4 provided statistically equal seal swell—there was less change in hardness when using the A508 (less A508 was used). A-11 and A-12 gave the most ideal results in PAO as the elastomers were not overly softened. All results were in permissible ranges. Similar comparisons were found in tests run in air environments. More additive generally results in more swell and more softening.

The benefit of the present invention is useful as an additive for ammonia based refrigeration fluids that could increase the seal swell and reduce seal hardening in the presence of a hydrocarbon lubricant. Seal shrinkage and seal hardening are often seen when converting an ammonia system from a mineral oil lubricant high in benzene and naphthalene (aryl and alkaryl) content to a mineral oil, hydrotreated mineral oil, or polyalphaolefin oil low in aryl and alkaryl content. Tests have shown that the polyalkylene glycol derivative can provide seal condition properties to other types of fluids, such as conventional types of polyalkylene glycols. Specifically, the polyalkylene glycol derivative can be used in an ammonia compressor lubricant, and in ammonia pumps, for seal swell. Alternatively, the polyalkylene glycol derivative can be used in HFC, hydrocarbon, $CO_2$ and air compressors and pumps for seal swell.

Example 2

Properties for three oils (A-508, A-511, and A-531) are given in TABLE 2. A miscibility test of each of these oils was performed in ammonia, wherein the each oil was evaluated at a composition of 10% and 40%. FIG. 1 displays a graph with the results of this test. Only A-511 was miscible with ammonia between temperatures of 0 to 60 degrees C. Miscibility is desired if the oil return is dependant on the oil completely mixing with the refrigerant. Miscibility is not desirable if the PAGs of the present invention are mixed with mineral oils or PAOs are used as a seal swell additive. Miscibility is also not desirable where oil return systems are designed around the oil separating from the refrigerant, such as in large industrial refrigeration systems.

Example 3

Figure 2:
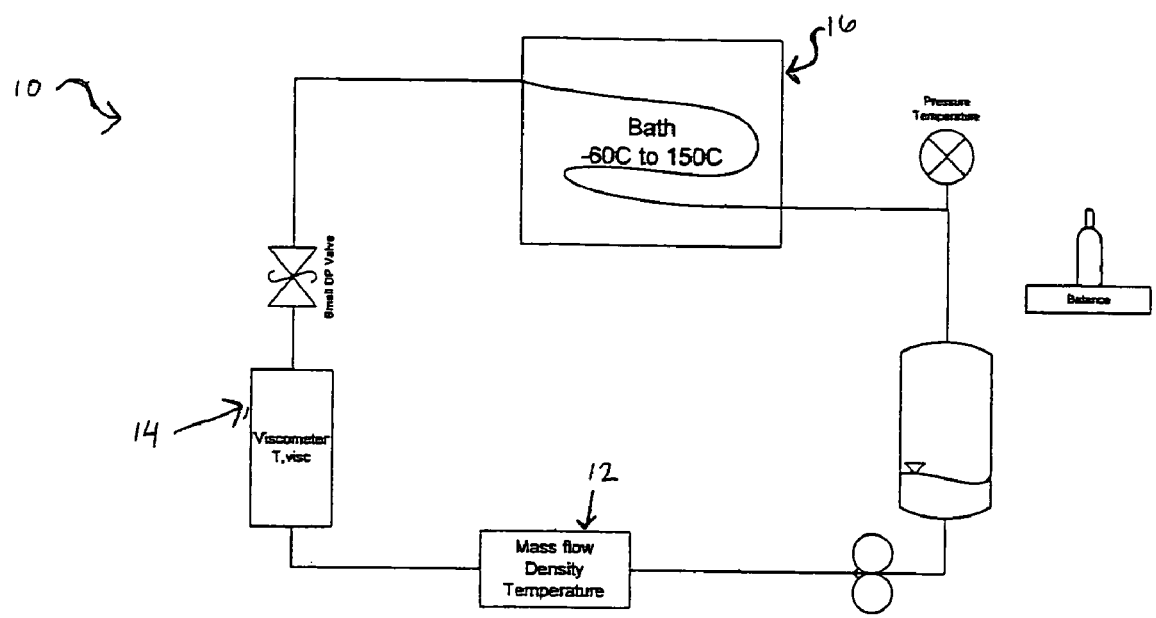
FIG. 2 is a schematic diagram of a flow loop.

A flow loop has been constructed, tested and calibrated for the measurement of refrigerant-lubricant mixture properties, as shown in the simplified schematic of FIG. 2. The design of the loop allows for the continuous circulation of the liquid mixture as well as providing agitation to achieve vapor-liquid equilibrium. The lubricant is first gravimetrically charged (±0.02 grams) into the system and cooled to approximately 10 K below room temperature (to speed refrigerant charging) at which time the refrigerant is gravimetrically charged (±0.02 grams) from a small stainless steel cell to achieve the desired bulk composition in the system (total grams of refrigerant/total grams of refrigerant and lubricant). The bulk composition is not the same as the measured liquid composition as, for safety, there exists a small vapor space to allow for the expansion and contraction of the liquid volume; therefore, a vapor space correction must be applied.

Once the system has been charged, a small gear pump is activated to circulate the liquid mixture through each of the measurement stages. The bulk mixture pressure is measured in the bulk flow reservoir with a calibrated pressure transducer (0.10% FS, ±0.2 bar). The liquid density is measured at the first measurement stage with a massflow meter 12, for example a Micromotion CMF10 massflow meter. The massflow meter measures the liquid density (±0.002 g/cc), circulating liquid temperature (±0.5K), as well as the circulating liquid massflow rate (±0.10% of rate). The liquid viscosity is measured at the second measurement stage with a high pressure viscometer 14 (Cambridge Allied Systems, viscosity ±1.0%; temperature ±0.20K). Incorporated into the viscometer housing are two high-pressure sight glasses to allow a viewing stage for liquid miscibility where if bulk mixture pressure is within 1% of the saturated refrigerant pressure, the mixture is observed for possible phase separation. Once passing through the sight glass, the liquid mixture flows through the main stage 16 of the temperature control loop where the temperature is set for cooling and heating modes.

Figure 3:
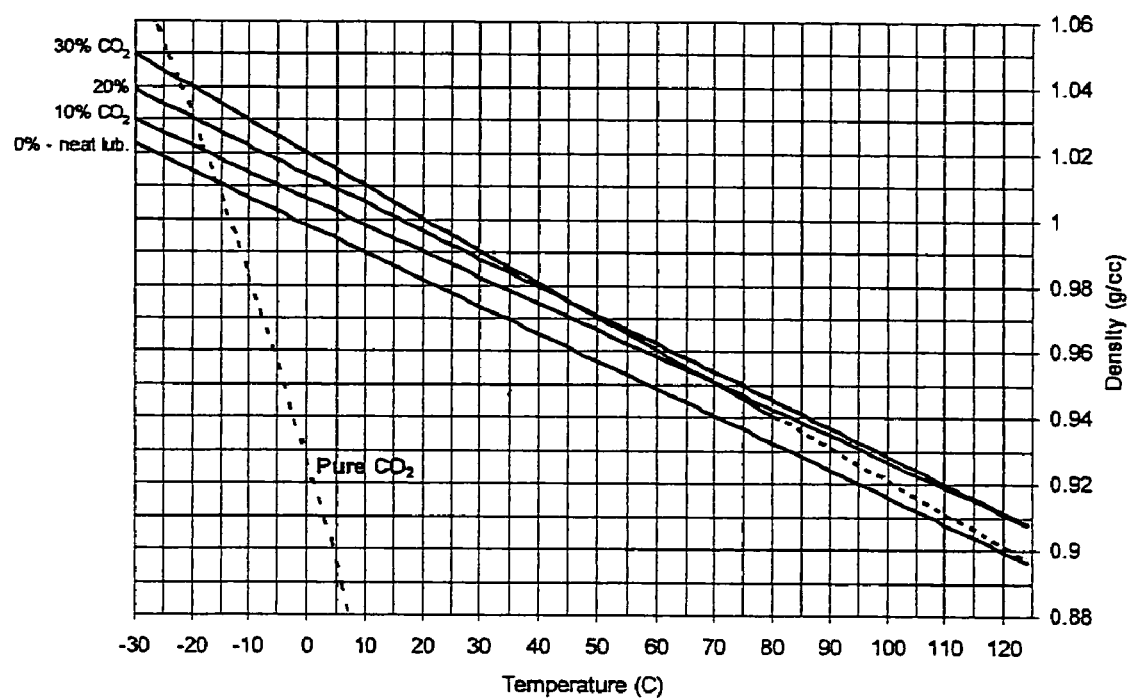
FIG. 3 is a graph of density of lubricant A-508 with $CO_2$ as a function of temperature.
Figure 4:
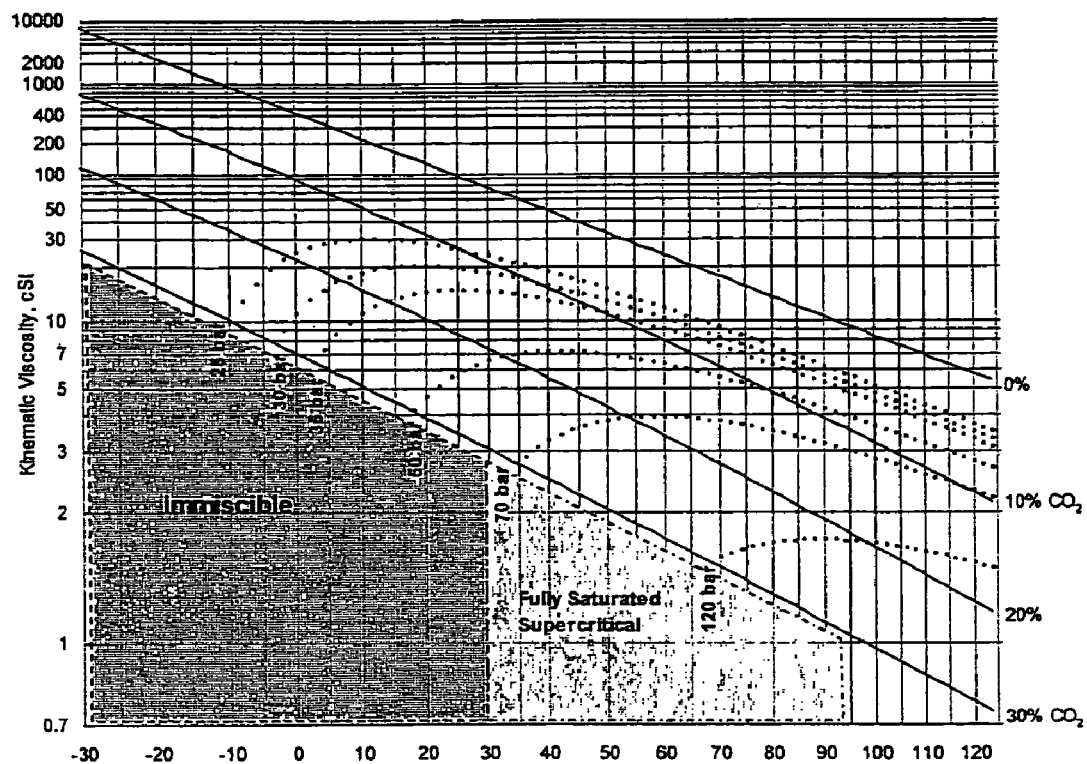
FIG. 4 is a Daniel Plot of vapor pressure and isobaric viscosity curves as a function of temperature and composition of lubricant A-508.
Figure 5:
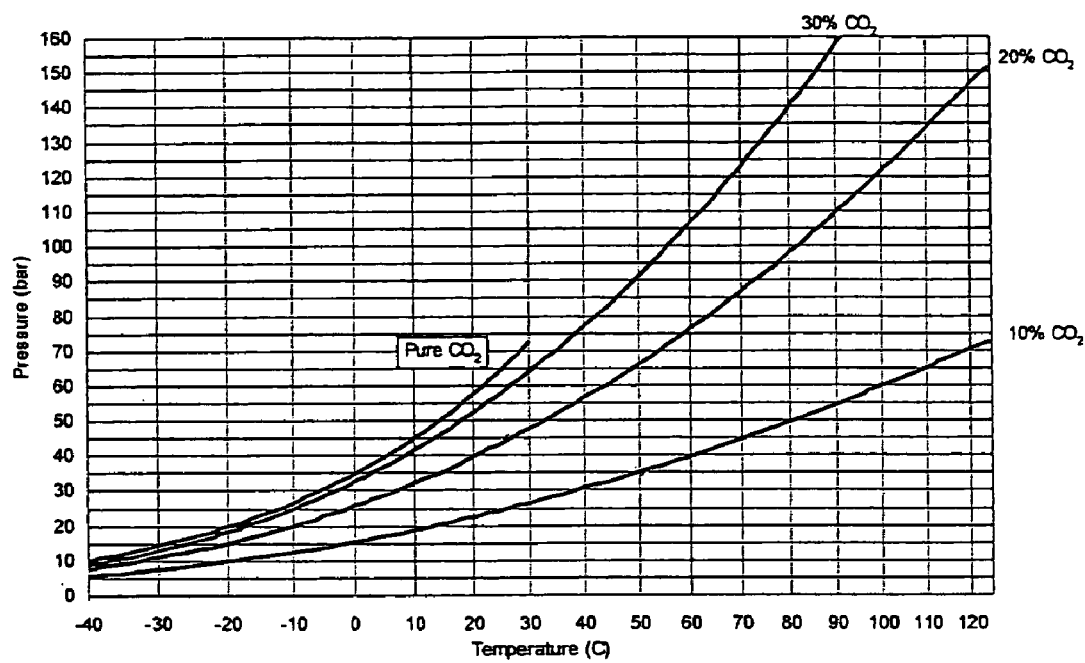
FIG. 5 is a graph of pressure of lubricant A-508 with $CO_2$ as a function of temperature.

Experimental measurements were made on mixtures of A-508 and carbon dioxide ($CO_2$). Experimental measurements of liquid density, vapor pressure (solubility) and viscosity at concentrations of 8.5, 15, 27, and 35 w/w percent $CO_2$ were recorded over a temperature range of −25 to +125° C. using a viscometer of 5-125 cSt range, and 7, 15, 23, 30, and 43 w/w percent $CO_2$ using a viscometer of 0.5-12 cSt range. Results of the liquid density, solubility and liquid viscosity are presented in the form of mathematical models below and figures. FIG. 3 plots density versus temperature at constant compositions. FIG. 4 plots vapor pressure and isobaric viscosity curves as a function of temperature and composition (i.e. a Daniel Plot). Additionally, FIG. 5 displays temperature versus pressure at various w/w percent $CO_2$. Data is shown in TABLE 3.

Like most PAG oils with $CO_2$, this lubricant-refrigerant mixture experienced a miscibility transition. For this mixture, this transition occurred at approximately 31 to 34 w/w percent $CO_2$ and is within the range of transition compositions of other commercial PAG lubricants. This mixture also experiences a phase inversion where the liquid rich $CO_2$ phase becomes denser than the lubricant rich liquid phase at approximately −25° C. and is typical for PAG-$CO_2$ mixtures.

In order to accurately represent the experimental data and to provide for interpolation between the measured constant composition curves, equations in two independent variables are desirable and were derived. The forms of these equations are given below.

Dynamic viscosity is given by $$\mathrm{Log}_{10}(\mathrm{Log}_{10}(\mu + 0.7)) = \quad (1)$$
$$a_1 + a_2 \mathrm{Log}_e(T) + a_3 \mathrm{Log}_e^2(T) + \omega(a_4 + a_5 \mathrm{Log}_e(T) + a_6 \mathrm{Log}_e^2(T)) +$$
$$\omega^2(a_7 + a_8 \mathrm{Log}_e(T) + a_9 \mathrm{Log}_e^2(T))$$

where $\mu$ = absolute viscosity, centipoises $T$ = temperature, Kelvin $\omega$ = mass fraction refrigerant $\mathrm{Log}_{10}$ = logarithm to the base 10

$\mathrm{Log}_e$ = logarithm to base $e$ (natural log)

$a_1$ through $a_9$ = constants

Vapor pressure is represented by $$\mathrm{Log}_{10}(P) = a_1 + a_2/T + a_3/T^2 + \quad (2)$$
$$\mathrm{Log}_{10}(\omega)\{a_4 + a_5/T + a_6/T^2\} + \mathrm{Log}_{10}^2(\omega)\{a_7 + a_8/T + a_9/T^2\}$$

where $P$ = pressure, bar $T$ = temperature, Kelvin

-continued $\omega$ = mass fraction refrigerant $\mathrm{Log}_{10}$ = logarithm to the base 10

$a_1$ through $a_9$ = constants (different from equation 1)

Density is given by $$\rho = a_1 + a_2 T + a_3 T^2 + \omega(a_4 + a_5 T + a_6 T^2) + \omega(a_7 + a_8 T + a_9 T^2) \quad (3)$$

where $\rho$ = density, g/cc

T = temperature, Kelvin $\omega$ = mass fraction refrigerant $a_1$ through $a_9$ = constants (different from equations 1, 2)

Kinematic viscosity is given by $$\mathrm{Log}_e(\mathrm{Log}_e(v + 0.7 + K_0(v + \varphi))) = \quad (4)$$
$$a_1 + a_2 \mathrm{Log}_e(T) + a_3 \mathrm{Log}_e^2(T) + \omega(a_4 + a_5 \mathrm{Log}_e(T) + a_6 \mathrm{Log}_e^2(T)) +$$
$$\omega^2(a_7 + a_8 \mathrm{Log}_e(T) + a_9 \mathrm{Log}_e^2(T))$$

where $\varphi$ = constant, 1.244067769

$v$ = kinematic viscosity, centipoises $T$ = temperature, Kelvin $\omega$ = mass fraction refrigerant $\mathrm{Log}_e$ = logarithm to base $e$ (natural log)

$K_0$ = zero order modified Bessel function of the second kind

In Microsoft Excel® 2003 → BesselK($v$ + 1.244067769, 0)

$a_1$ through $a_9$ = constants (different from equations 1, 2, 3)

Multivariate correlation coefficients are given as a measure of how well the regression equations fit the data. Following usual practice, the correlation coefficient is defined by $$\sigma = \{(\Sigma(y_{i-yav})^2 - \Sigma(y_1 - y_c)^2)/\Sigma(y_i - y_{av})^2\}^{1/2} \quad (5)$$

where $\sigma$ = correlation coefficient $y_i$ = measured data $y_{av}$ = average of measured data $y_c$ = value calculated from regression equation, and summations run over all data points Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

TABLE 1

Test results with 100-105 psig ammonia - 200° F. for 7 days

| Sample# | Material (oil) | Elastomer | Swell Change mm | Hardness shore A (change) |
|---|---|---|---|---|
| A-1 | HT-68 (96%) + 4% NP-PAG | BUNA N (70) | 0.001 | 63 (−7) |
| A-2 | HT-68 (96%) + 4% NP-PAG | Neoprene (70) | 0.005 | 63 (−7) |
| A-3 | PAO 4 (95%) + 5% NP-PAG | BUNA N (70) | 0.002 | 63 (−7) |
| A-4 | PAO 4 (95%) + 5% NP-PAG | Neoprene (70) | 0.004 | 64 (−6) |
| A-5 | HT-68 (96%) + 4% A508 | BUNA N (70) | 0.001 | 62 (−8) |
| A-6 | HT-68 (96%) + 4% A508 | Neoprene (70) | 0.005 | 63 (−7) |
| A-11 | PAO 4 (96%) + 4% A508 | BUNA N (70) | 0.001 | 69 (−1) |
| A-12 | PAO 4 (96%) + 4% A508 | Neoprene (70) | 0.005 | 66 (−4) |

Note
HT-68: Group II severely hydrotreated mineral oil ISO VG 69
PAO-4: polyalphaolefin (PAO) type synthetic hydrocarbon - approx 4 cSt at 100° C.
NP-PAG: nonyl phenol propoxylate with hydroxyl end group - 10.4 moles propoxylates
A-508: nonyl phenol propoxylates with CH3 end group - 10.4 moles propoxylates

TABLE 2

Properties of Samples

| | A-508 | A-511 | A-531 |
|---|---|---|---|
| Structure | Nonyl phenol-(PO, approximately 10.4 averages moles)-methyl cap | Nonyl phenol-(PO, approximately 9 moles)-methyl cap | Nonyl phenol-(EO/PO random, approx. 12-13 moles)-methyl cap; about 50/50 EO/PO by wt % |
| Water (wt %) | 0.01 | 0.03 | 0.01 |
| TAN (mgKOH/g) | 0.02 | 0.02 | 0.01 |
| Color | 1G | <1G | 90 |
| Appearance | Pass - clear and free from visible impurities | Pass - clear and free from visible impurities | Clear and free from visible impurities |
| Viscosity at 40° C. (cSt) | 59.1 | 93.7 | 65.5 |
| Viscosity at 100° C. (cSt) | 9.44 | 14.8 | 11.55 |
| Viscosity Index | 142 | 165 | 173 |
| Flash point coc (° C.) | 242 | 242 | 197 |
| Flash point ccc (° C.) | 188 | 188 | 262 |
| Pour point (° C.) | −42.0 | −42.0 | −42 |
| Molecular Wt (AVE) g/mol | 837 | 1336 | NA |
| Density at 20° C. (mg/mL) | 0.978 | 0.985 | 1.023 |

TABLE 3

Viscosity, Solubility, and Density Parameters of A-508/CO2

| Coefficient | Dynamic Viscosity (eq. 1) | Vapor Pressure (eq. 2) | Density (eq. 3) | Kinematic Viscosity (eq. 4) |
|---|---|---|---|---|
| a1 | 4.67019E+00 | 3.92180E+00 | 1.22299E+00 | 1.97342E+01 |
| a2 | −9.69027E−02 | −1.30112E+02 | −8.22264E−04 | −3.14245E+00 |
| a3 | −1.17679E−01 | −1.28654E+05 | 0 | −9.43029E−03 |
| a4 | −2.74339E+02 | 1.16333E+00 | −1.06792E−01 | −5.40007E+02 |
| a5 | 9.79392E+01 | −2.29514E+01 | 6.98915E−04 | 1.93205E+02 |
| a6 | −8.77812E+00 | −6.17622E+04 | 0 | −1.73672E+01 |
| a7 | 7.69220E+02 | −9.68758E−02 | 1.11893E+00 | 1.64772E+03 |
| a8 | −2.72036E+02 | −2.46790E+01 | −4.22960E−03 | −5.84371E+02 |
| a9 | 2.40077E+01 | −7.14583E+03 | 0 | 5.17129E+01 |
| σ | 9.84800E−01 | 9.99970E−01 | 9.95000E−01 | 9.84900E−01 |

Note:
Immiscible and fully saturated supercritical transition occurs at approximately 31-34 weight percent CO2.
Density phase inversion occurs at approximately −25 degrees C.
These equations are valid up to 30 weight percent CO2.

The invention claimed is:

1. A lubricant comprising an alkyl phenol alkoxylate including a hydrocarbon end group of the formula: alkyl-phenol-alkylene oxide-Y, wherein Y is said hydrocarbon end group; and said alkyl-phenol-alkylene oxide is defined by $Z((CH_2CH(R_1)O)_n(CH_2CH(R_1)O)_m)_pH$ wherein Z is a residue of an aryl compound having 1-8 active hydrogens and at least 6 carbons when Z is an aryl group and at least 10 carbons when Z is an alkyl group; $R_1$ is hydrogen, methyl, ethyl, or a mixture thereof; n is 0 or a positive number; m is a positive number; p is an integer having a value equal to the number of active hydrogens in the compound of which Z is a residue; and wherein Y replaces the last H in the formula for said alkyl-phenol-alkylene oxide.

2. The lubricant of claim 1, wherein said hydrocarbon end group is chosen from the group consisting of a methyl group, alkyl group, aryl group, or other hydrocarbon group.

3. The lubricant of claim 1, wherein a ratio of molecular weight of said alkyl phenol to total molecular weight of said lubricant is 8-55%.

4. The lubricant of claim 1, wherein said alkyl phenol is an initiator and is chosen from the group consisting of phenol, methyl phenol, ethyl phenol, propyl phenol, nonyl phenol, dinonyl phenol, or dialkyl phenol.

5. The lubricant of claim 1, wherein said alkylene oxide is chosen from the group consisting of ethylene oxide, propylene oxide, butylene oxide, or polymers thereof.

6. The lubricant of claim 1, wherein said lubricant has a molecular weight from 200 to 4000, and preferably from 400 to 2000.

7. The lubricant of claim 1, wherein said lubricant has a viscosity at 40 degrees C. of 10 to 500 cSt, and preferably 25 to 150 cSt.

8. The lubricant of claim 1, further including a second lubricant in the amount of 10 to 25% chosen from the group including polyglycols, polyethers, esters, mineral oils, and synthetic hydrocarbons.

9. The lubricant of claim 1, further including additives of anti-oxidants, corrosion inhibitors, and hydrolysis inhibitors.

10. The lubricant of claim 1, in combination with a substance chosen from the group consisting of air, hydrocarbon gases, or carbon dioxide.

11. A fluid composition for refrigeration systems, comprising the lubricant composition of claim 1 and a refrigerant.

12. The fluid composition of claim 11, wherein said refrigerant is chosen from the group consisting of ammonia, chlorofluorocarbons, hydrochlorofluorocarbons, or hydrofluorocarbons.

13. A method of lubricating compression refrigeration equipment, including the step of mixing the lubricant of claim 1 with a compound chosen from the group consisting of a refrigerant, carbon dioxide, propane, or hydrocarbon gas.

14. A seal swell additive, comprising the lubricant of claim 1.

15. An additive for compressor and machinery applications, comprising the lubricant of claim 1.

16. A mineral oil pour point improver, comprising the lubricant of claim 1.

17. A machinery cleanser, comprising the lubricant of claim 1.

18. A carbon dioxide additive, comprising the lubricant of claim 1.

* * * * *